Jan. 10, 1933.  C. P. SCHILPP  1,893,686
ARTIFICIAL FISH LURE
Filed Aug. 28, 1931
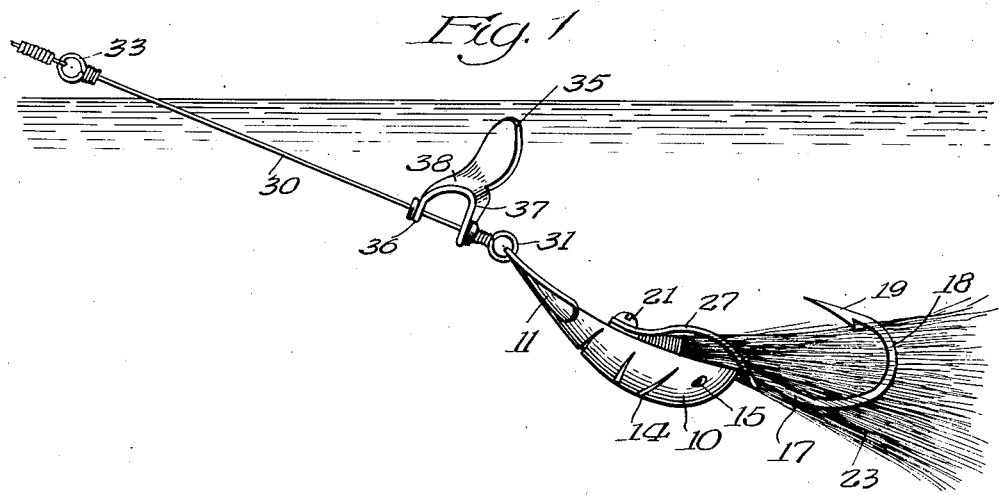
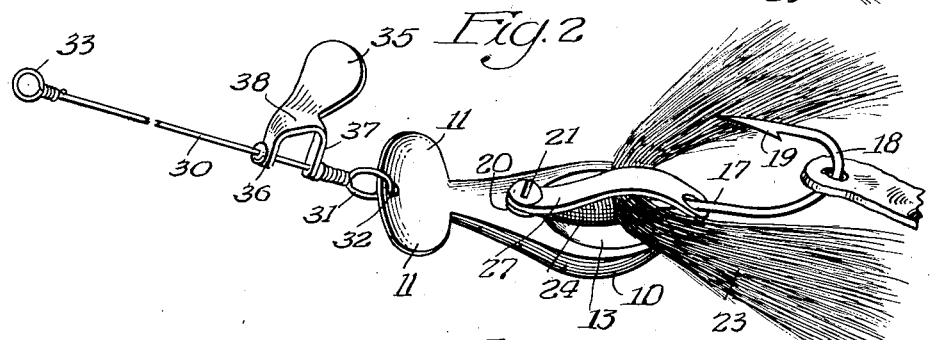
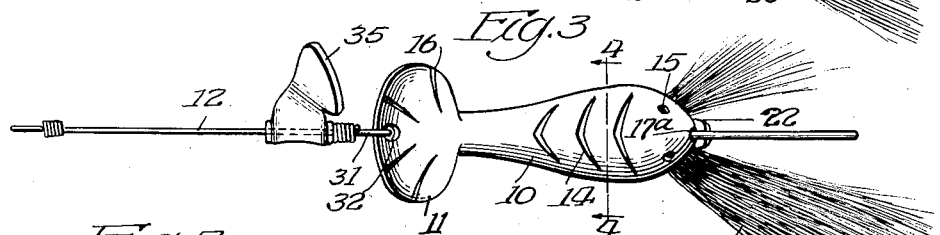
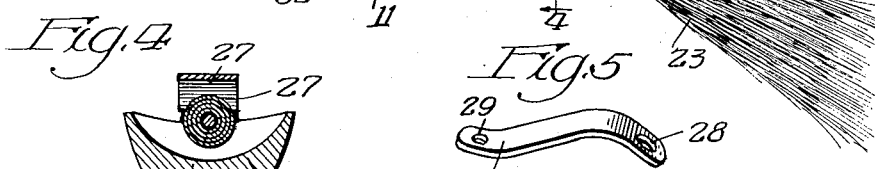
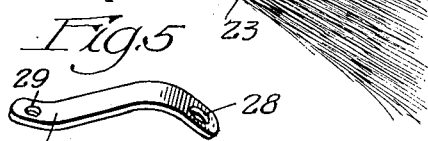
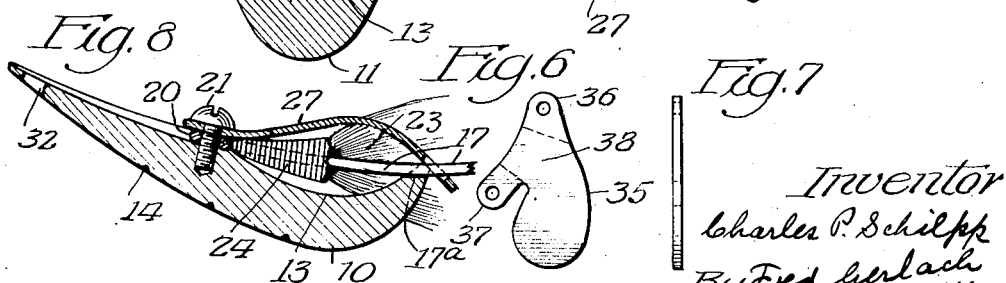
Inventor
Charles P. Schilpp
By Fred Gerlach
Atty.

Patented Jan. 10, 1933

1,893,686

UNITED STATES PATENT OFFICE

CHARLES P. SCHILPP, OF CLEVELAND HEIGHTS, OHIO

ARTIFICIAL FISH LURE

Application filed August 28, 1931. Serial No. 559,828.

The invention relates to artificial fish lures.

One object of the invention is to provide an artificial lure which comprises a fibrous member or buck-tail with means for spreading the fibers laterally to assist in deflecting weeds from the hook on the body.

Another object of the invention is to provide an improved spinner for artificial lures which can be fabricated easily and at a low cost, and which is effective in causing the lure to wiggle and is shaped to avoid catching on weeds.

Other objects of the invention will appear from a consideration of the following detail description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views; Fig. 1 is a side elevation of a lure embodying the invention. Fig. 2 is a perspective. Fig. 3 is an inverted plan. Fig. 4 is a transverse section on the line 4—4 of Fig. 3. Fig. 5 is a perspective of the spreader for the fibers of the buck-tail. Figs. 6 and 7 are details of the blank from which the spinner is formed. Fig. 8 is a longitudinal section through the body of the lure.

The invention is exemplified in a lure comprising a metal body 10 which has its underside convexly curved transversely and longitudinally and embodies a concave pocket 13 in its upper face. Wings 11 are integrally formed with the body at its front end and project laterally therefrom. The underside of the body has grooves 14 and eyes 15 and wings 11 have grooves 16 formed therein to impart a crawfish appearance to the body. The wings 11 curve upwardly and outwardly from the longitudinal center of the body, and the upper face thereof is slightly concave. With the body and wings thus constructed, the weight of the body is pratically all below the center of gravity so the lure will travel through the water at a suitable angle, and the wings hold the body against rotation on its longitudinal axis. A hook comprising a shank 17 overlying the body and an upstanding loop 18 with a forwardly extending point 19 and an eye 20 overlying the upper face of the body 10. A screw 21 is threaded into the body and extends through an eye 20 of the hook. The head of the screw is adapted removably to secure the hook to the body. The shank 17 passes through a notch 17ª in the rear end of the body to secure the rear portion of the hook against lateral displacement. This exemplifies a fish-hook which is rigidly secured to the body and extends rearwardly therefrom with its point above the body.

A bucktail or fibrous member consists of a group of hairs or fibers 23, the front ends of which are bunched together by a suitable wrapping 24 of thread around the shank of the hook, and the rear ends of the fibers are free. The front ends of the fibers are secured to the hook by said wrapping. This member is also removable from the body with the hook. If desired, the front end of a strip of flexible pork rind may be connected to the hook to provide a wiggly tail-piece.

A spreader 27 is adapted to divide the free or rear ends of the fibers into two loose bunches, one at either side of the hook, and to hold the bunches spread so they will project laterally and diverge rearwardly adjacent the sides of the hook. These fibers are flexible, but sufficiently stiff to deflect weeds away from the hook or deflect the hook away from the weeds, and thereby prevent the hook from catching the weeds. This spreader consists of a flat strip of metal having a slot 28 at its rear end so it can be slipped over the point of the hook and onto the shank and so the rear end of the strip will be secured laterally by the hook. A hole 29 is provided at the front end of the spreader strip through which the screw 21 passes to secure removably the spreader on the body. Intermediate its ends, this strip is arched to fit snugly over the front portion of the bucktail member. This exhibits a lure with a fibrous member or buck-tail, in which the free ends of the fibers are spread apart to diverge rearwardly from the body so the fibers will aid in preventing the hook from catching weeds; also a spreader which is removable to permit the fibrous member to be replaced when desired.

A rod 30 of wire has an eye 31 at its rear end which passes through a hole 32 in the front end of the body 10, and has an eye 33 at its front end for connection to a fishing line. The improved spinner for causing the lure to wiggle is formed of a plate of sheet metal cut in a shape which is shown in Fig. 6. This plate comprises a substantially round, blade-forming portion, a perforated ear projecting from one end of the blade portion and a second perforated ear extending obliquely from one side of the blade portion. This blank is bent to form a single oblique blade 35, an ear 36 which forms a front bearing on the rod 30 and an ear 37 which forms a rear bearing on the rod. The ears 36 and 37 are bent so they will be substantially parallel and rigidly connected by an oblique portion 38, the blade 35 constituting an oblique extension of said portion. This exemplifies a spinner made of a single plate of metal and comprising an oblique blade which extends from one side of the axis of the rod only and two bearings which can be formed by simple dies and at a low cost, and which will cause the bait to wiggle as it is drawn through the water and produce a decided flash as it is rotated.

In operation, as the bait is drawn through the water, usually at an angle, as shown in Fig. 1, the spread bunches of fibers at the sides of hook will aid in preventing the hook from catching weeds. The rotation of the spinner will cause the lure to wiggle and produce a decided flash. The shape of the body is such as to cause it to clear or worm itself between weeds and to wobble as it is drawn through the water on its longitudinal axis. The spreader is removable to permit the buck-tail to be replaced when desired. A single screw serves to secure the spreader, buck-tail and hook on the body. The spinner is effective in causing the lure to wiggle and can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. An artificial lure comprising a body, a hook rigidly secured to said body and extending rearwardly therefrom, a member composed of flexible fibers extending rearwardly from the body and along the hook, a longitudinally extending strip of metal having an opening in the rear end thereof and extending over the shank of the hook for spreading groups of the fibers so they will project laterally at the sides of the hook, and a screw for removably securing the strip to the body, the shank of the hook extending through the opening in the strip to hold the strip against lateral displacement.

2. An artificial lure comprising a body, a hook secured to said body and extending rearwardly therefrom, a member composed of flexible fibers extending along the hook and bunched at their front ends around the shank of the hook, a strip of metal for spreading groups of the fibers laterally at the sides of the hook, and a screw removably securing the hook and strip to the body.

3. An artificial lure comprising a body, a hook having an eye and a shank adapted to extend rearwardly from the body, a member composed of flexible fibers having their front ends bunched on and secured to the shank of the hook and their rear ends free and extending rearwardly from the body and a strip separate from the hook, secured to the body, and overlying the shank and bunched portions of the fibers, and extending rearwardly of the body to spread the free ends of the fibers at the sides of the hook.

4. An artificial lure comprising a body, a hook having an eye and a shank adapted to extend rearwardly from the body, a member composed of flexible fibers having their front ends bunched on and secured to the shank and their rear ends free and extending rearwardly from the body, a longitudinally extending strip formed separately from the hook and having an opening in the rear end thereof, said strip being secured to the body and overlying the shank and eye and extending rearwardly of the body to spread the fibers at the sides of the hook, the shank of the hook extending through the opening in the strip so as to hold the strip against lateral displacement.

5. An artificial lure comprising a body, a hook having an eye and a shank adapted to extend rearwardly from the body, a member composed of flexible fibers having their front ends bunched on and secured to the shank and their rear ends free and extending rearwardly from the body, a strip separate from the hook, extending over the eye and rearwardly over the shank to spread the free ends of the fibers so they will project laterally at the sides of the hook, and means for conjointly securing the front end of the strip and the hook to the body.

6. An artificial lure comprising a body, a hook having an eye and a shank adapted to extend rearwardly from the body, a member composed of flexible fibers having their front ends bunched on and secured to the shank and their rear ends free, and extending rearwardly from the body, a strip separate from the hook extending over the eye and rearwardly over the shank to spread the free ends of the fibers so they will project laterally at the sides of the hook, and means extending through the front end of the strip and the eye for securing the strip and the hook on the body.

7. An artificial lure comprising a body, a hook having an eye and a shank adapted to extend rearwardly from the body, a member composed of flexible fibers having their front ends bunched on and secured to the shank and their rear ends free and extending rearwardly from the body, a longitudinally extending strip having an opening in the rear end thereof and formed separately from the hook, said strip extending over the eye and rearwardly over the shank to spread the free ends of the fibers so they will project laterally at the sides of the hook, and means for conjointly securing the strip and hook to the body, the shank of the hook extending through the opening in the rear end of the strip so as to prevent lateral displacement of the strip.

Signed at Cleveland Heights, Ohio, this 24th day of August, 1931.

CHARLES P. SCHILPP.